United States Patent Office.

DANIEL LEIBERT, OF WASHINGTON, DISTRICT OF COLUMBIA.

Letters Patent No. 94,221, dated August 31, 1869.

IMPROVED LOTION FOR THE DESTRUCTION OF INSECTS.

The Schedule referred to in these Letters Patent and making part of the same.

*To all whom it may concern:*

Be it known that I, DANIEL LEIBERT, of the city and county of Washington, in the District of Columbia, have invented a Lotion for the Destruction of Vermin which infest trees, plants, vines, &c.; and I do hereby declare that the following is a full, clear, and exact description thereof.

The ingredients composing my lotion are as follows:

One gallon water; four ounces (avoirdupois) nicotiana; two ounces potash; two ounces staphisagria.

My mode of preparing the lotion is as follows:

The tobacco is to be steeped or macerated in warm water for about twelve hours, or for such time as is required to fully extract its strength. The potash is to be mixed with sufficient water to thoroughly dissolve it, and the staphisagria is to be steeped thoroughly, in order that its full strength may be extracted. Mix all together.

If it is intended to be used immediately, one-half the quantity of potash only is required.

Having thus described my invention,

What I claim, and desire to secure by Letters Patent, is—

The compound, composed of the ingredients, and in the quantities herein specified, for the destruction of vermin upon trees, vines, shrubs, &c.

DANIEL LEIBERT.

Witnesses:
 C. C. WILSON,
 HENRY N. MYGATT.